US006829297B2

(12) United States Patent
Xia et al.

(10) Patent No.: US 6,829,297 B2
(45) Date of Patent: Dec. 7, 2004

(54) ADAPTIVE EQUALIZER HAVING A VARIABLE STEP SIZE INFLUENCED BY OUTPUT FROM A TRELLIS DECODER

(75) Inventors: Jingsong Xia, Mundelein, IL (US); Richard W. Citta, Oak Park, IL (US); Scott M. LoPresto, Mount Prospect, IL (US); Wenjun Zhang, Shanghai (CN); Hangbin Song, Toronto (CA)

(73) Assignee: Micronas Semiconductors, Inc., Palatine, IL (US)

( * ) Notice: Subject to any disclaimer, the term of this patent is extended or adjusted under 35 U.S.C. 154(b) by 0 days.

(21) Appl. No.: 09/875,720

(22) Filed: Jun. 6, 2001

(65) Prior Publication Data

US 2002/0186762 A1 Dec. 12, 2002

(51) Int. Cl.$^7$ ............................................... H03K 5/159
(52) U.S. Cl. .................. 375/232; 375/341; 714/774
(58) Field of Search ...................... 375/229, 232, 375/233, 236, 262, 263, 264, 265, 284, 285, 340, 341, 346, 348, 349, 350, 343; 348/607, 622, 608, 614; 714/774, 780, 786, 792, 794, 795; 704/242; 708/300, 322, 323

(56) References Cited

U.S. PATENT DOCUMENTS

| | | | | |
|---|---|---|---|---|
| 4,833,693 A | * | 5/1989 | Eyuboglu ................... | 375/233 |
| 5,453,797 A | * | 9/1995 | Nicolas et al. .............. | 348/607 |
| 5,508,752 A | * | 4/1996 | Kim et al. ................... | 348/470 |
| 5,872,817 A | * | 2/1999 | Wei ............................. | 375/233 |
| 6,249,544 B1 | * | 6/2001 | Azazzi et al. ............... | 375/229 |

* cited by examiner

Primary Examiner—Tesfaldet Bocure
Assistant Examiner—Khanh Cong Tran
(74) Attorney, Agent, or Firm—Woodard, Emhardt, Moriarty, McNett & Henry LLP (57) ABSTRACT

An adaptive equalizer comprises a decision device; a decision feedback equalizer coupled to the decision device; an FIR filter coupled to the decision device; and a trellis decoder coupled to the decision device, adapted to provide a reliability output and a decoded output. An error signal is generated by subtracting an output of the decision feedback equalizer from an output of the decision device, the error signal being used to update coefficients of the taps of the FIR filter and the decision feedback equalizer. A magnitude of the change to the coefficients is selected based at least in part the reliability output of the trellis decoder.

1 Claim, 10 Drawing Sheets

ADAPTIVE EQUALIZER HAVING A VARIABLE STEP SIZE INFLUENCED BY OUTPUT FROM A TRELLIS DECODER

BACKGROUND

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multi-path reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

One important source of error is intersymbol interference ("ISI"). ISI occurs when pulsed information, such as an amplitude modulated digital transmission, is transmitted over an analog channel, such as, for example, a phone line or an aerial broadcast. The original signal begins as a reasonable approximation of a discrete time sequence, but the received signal is a continuous time signal. The shape of the impulse train is smeared or spread by the transmission into a differentiable signal whose peaks relate to the amplitudes of the original pulses. This signal is read by digital hardware, which periodically samples the received signal.

Each pulse produces a signal that typically approximates a sinc wave. Those skilled in the art will appreciate that a sinc wave is characterized by a series of peaks centered about a central peak, with the amplitude of the peaks monotonically decreasing as the distance from the central peak increases. Similarly, the sinc wave has a series of troughs having a monotonically decreasing amplitude with increasing distance from the central peak. Typically, the period of these peaks is on the order of the sampling rate of the receiving hardware. Therefore, the amplitude at one sampling point in the signal is affected not only by the amplitude of a pulse corresponding to that point in the transmitted signal, but by contributions from pulses corresponding to other bits in the transmission stream. In other words, the portion of a signal created to correspond to one symbol in the transmission stream tends to make unwanted contributions to the portion of the received signal corresponding to other symbols in the transmission stream.

This effect can theoretically be eliminated by proper shaping of the pulses, for example by generating pulses that have zero values at regular intervals corresponding to the sampling rate. However, this pulse shaping will be defeated by the channel distortion, which will smear or spread the pulses during transmission. Consequently, another means of error control is necessary. Most digital applications therefore employ equalization in order to filter out ISI and channel distortion.

Generally, two types of equalization are employed to achieve this goal: automatic synthesis and adaptation. In automatic synthesis methods, the equalizer typically compares a received time-domain reference signal to a stored copy of the undistorted training signal. By comparing the two, a time-domain error signal is determined that may be used to calculate the coefficient of an inverse function (filter). The formulation of this inverse function may be accomplished strictly in the time domain, as is done in Zero Forcing Equalization ("ZFE") and Least Mean Square ("LMS") systems. Other methods involve conversion of the received training signal to a spectral representation. A spectral inverse response can then be calculated to compensate for the channel distortion. This inverse spectrum is then converted back to a time-domain representation so that filter tap weights can be extracted.

In adaptive equalization the equalizer attempts to minimize an error signal based on the difference between the output of the equalizer and the estimate of the transmitted signal, which is generated by a "decision device." In other words, the equalizer filter outputs a sample, the decision device determines what value was most likely transmitted, and the adaptation logic attempts to keep the difference between the two small. The main idea is that the receiver takes advantage of the knowledge of the discrete levels possible in the transmitted pulses. When the decision device quantizes the equalizer output, it is essentially discarding received noise. A crucial distinction between adaptive and automatic synthesis equalization is that adaptive equalization does not require a training signal.

Error control coding generally falls into one of two major categories: convolutional coding and block coding (such as Reed-Solomon and Golay coding). At least one purpose of equalization is to permit the generation of a mathematical "filter" that is the inverse function of the channel distortion, so that the received signal can be converted back to something more closely approximating the transmitted signal. By encoding the data into additional symbols, additional information can be included in the transmitted signal that the decoder can use to improve the accuracy of the interpretation of the received signal. Of course, this additional accuracy is achieved either at the cost of the additional bandwidth necessary to transmit the additional characters, or of the additional energy necessary to transmit at a higher frequency.

A convolutional encoder comprises a K-stage shift register into which data is clocked. The value K is called the "constraint length" of the code. The shift register is tapped at various points according to the code polynomials chosen. Several tap sets are chosen according to the code rate. The code rate is expressed as a fraction. For example, a ½ rate convolutional encoder produces an output having exactly twice as many symbols as the input. Typically, the set of tapped data is summed modulo-2 (i.e., the XOR operation is applied) to create one of the encoded output symbols. For example, a simple K=3, ½ rate convolutional encoder might form one bit of the output by modulo-2-summing the first and third bits in the 3-stage shift register, and form another bit by modulo-2-summing all three bits.

A convolutional decoder typically works by generating hypotheses about the originally transmitted data, running those hypotheses through a copy of the appropriate convolutional encoder, and comparing the encoded results with the encoded signal (including noise) that was received. The decoder generates a "metric" for each hypothesis it considers. The "metric" is a numerical value corresponding to the degree of confidence the decoder has in the corresponding hypothesis. A decoder can be either serial or parallel—that is, it can pursue either one hypothesis at a time, or several.

One important advantage of convolutional encoding over block encoding is that convolutional decoders can easily use "soft decision" information. "Soft decision" information essentially means producing output that retains information about the metrics, rather than simply selecting one hypothesis as the "correct" answer. For an overly-simplistic example, if a single symbol is determined by the decoder to have an 80% likelihood of having been a "1" in the transmission signal, and only a 20% chance of having been a "0", a "hard decision" would simply return a value of 1 for that symbol. However, a "soft decision" would return a value of 0.8, or perhaps some other value corresponding to that distribution of probabilities, in order to permit other hardware downstream to make further decisions based on that degree of confidence.

Block coding, on the other hand, has a greater ability to handle larger data blocks, and a greater ability to handle burst errors.

Figure 1:
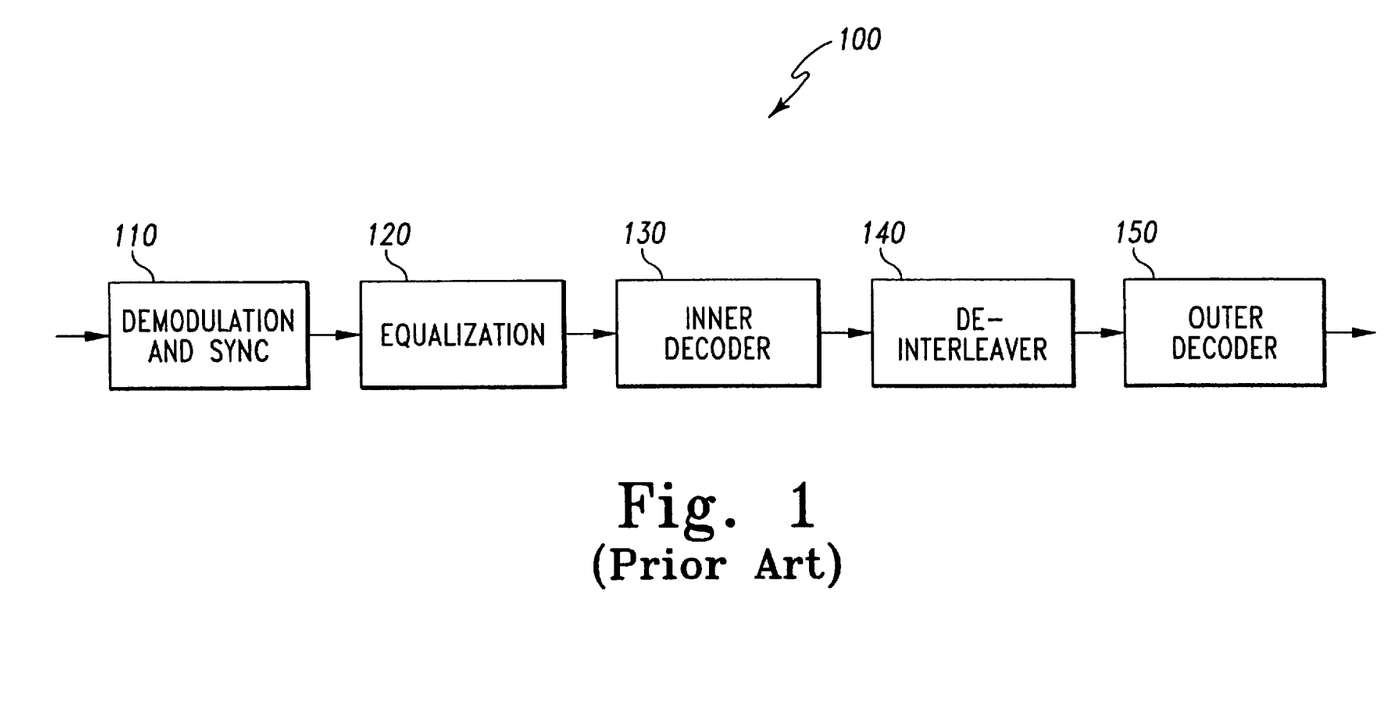
FIG. 1 is a block diagram of a prior art digital receiver.

FIG. 1 illustrates a block diagram of a typical digital communication receiver, including channel coding and equalization, indicated generally at 100. The receiver 100 comprises a demodulation and sync component 110, which converts the received analog signal back into a digital format. The receiver 100 further comprises an equalizer 120, an inner decoder 130, a de-interleaver 140, and an outer decoder 150. The inner coding is typically convolutional coding, while the outer coding is typically block coding, most often Reed-Solomon coding. The convolutional and block coding are generally combined in order to exploit the complementary advantages of each.

Figure 2:
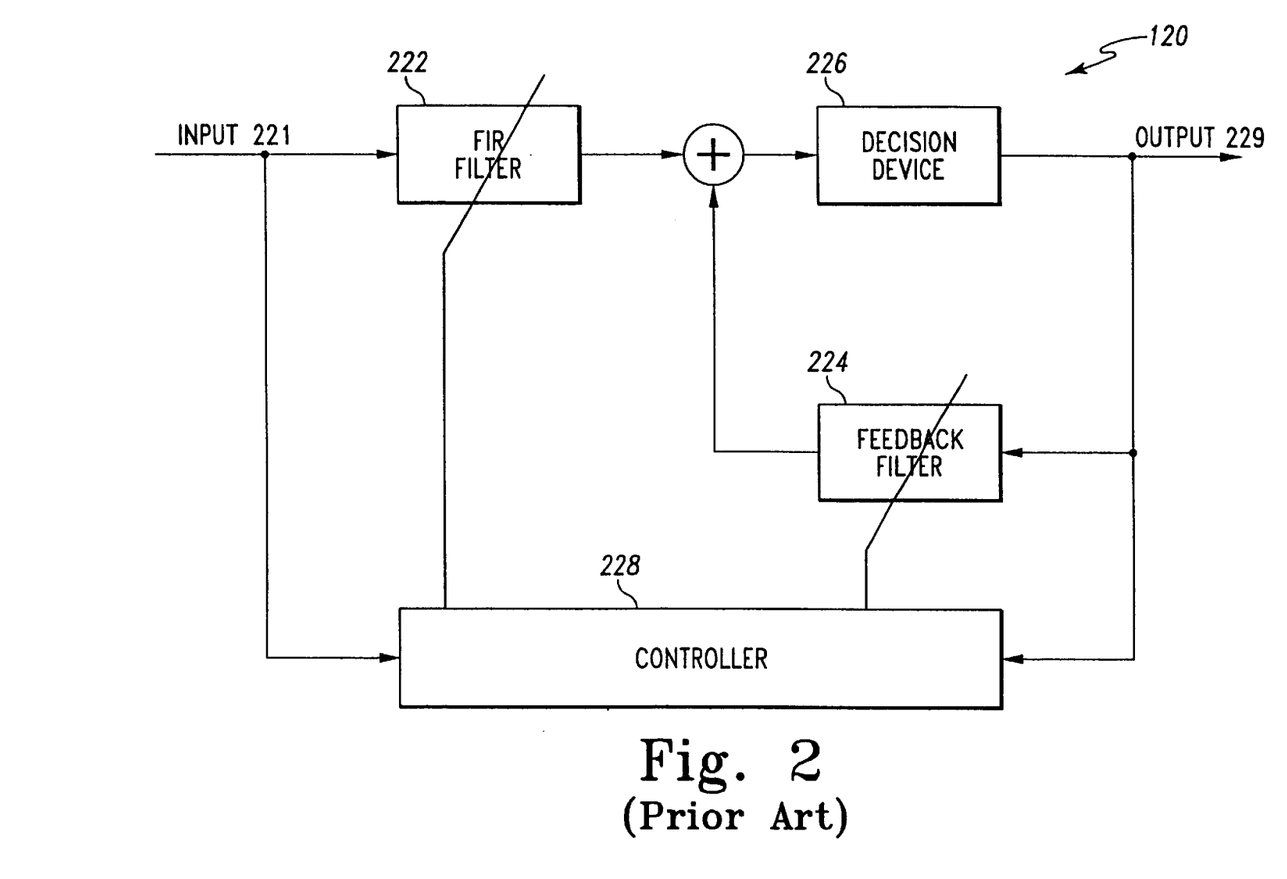
FIG. 2 is a diagram of a prior art equalizer suitable for use in the digital receiver of FIG. 1.

FIG. 2 is a diagram of an equalizer 120 such as is commonly used in the digital receiver 100 shown in FIG. 1. Typically, the equalizer 120 includes a controller 228, a finite impulse response ("FIR") filter 222, a decision device 226, and a decision feedback equalizer ("DFE") 224. The FIR filter 222 receives the input signal 221. The FIR filter 222 is used to cancel pre-ghosts—that is, ghost signals that arrive before the main transmission signal. The decision device 226 examines its inputs and makes a decision as to which one of the received signals at its input is the signal to be transmitted to the output 229. The input to the decision device 226 is modified by a decision feedback equalizer 224, which is used to cancel post-ghosts—that is, ghost signals that arrive after the main transmission signal—and the residual signal generated by the FIR filter 222.

The decision device 226 is typically a hard decision device, such as a slicer. For example, in an 8 VSB system, the slicer can be a decision device based upon the received signal magnitude, with decision values of 0, ±2, ±4, and ±6, in order to sort the input into symbols corresponding to the normalized signal values of ±1, ±3, ±5, and ±7. For another example, the slicer can be multi-dimensional, such as those used in quadrature amplitude modulation ("QAM") systems.

The controller 228 receives the input data and the output data and generates filter coefficients for both the FIR filter 222 and the decision feedback filter 224. Those skilled in the art will appreciate that there are numerous methods suitable for generating these coefficients, including LMS and RLS algorithms.

Figure 3:
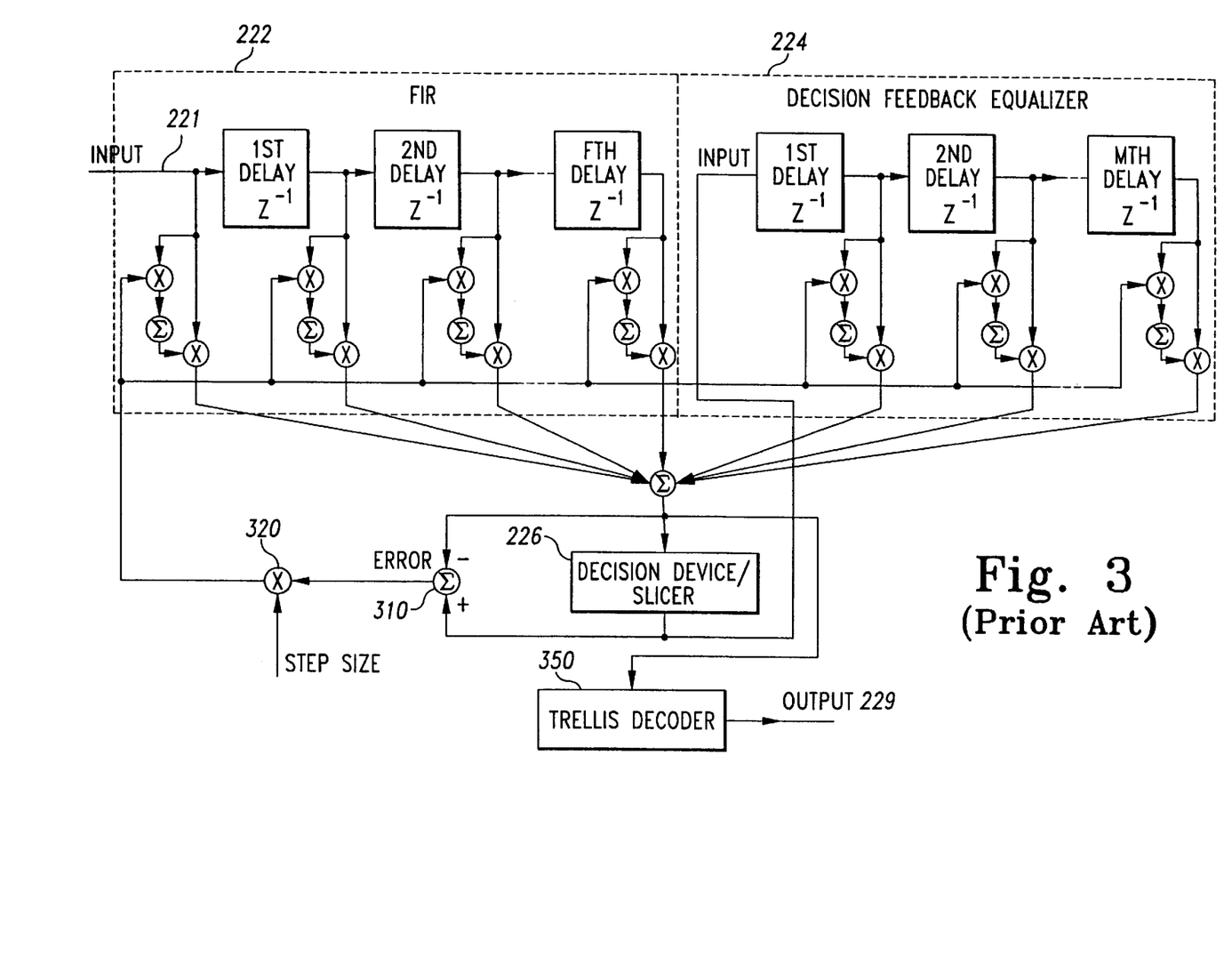
FIG. 3 is a diagram showing further details of the prior art decision feedback equalizer in FIG. 2.

FIG. 3 illustrates further details of the equalizer 120 shown in FIG. 2. The input to the decision feedback equalizer 224 is output from the decision device 226, such as a slicer. The input data is delayed (F+M) stages, where F equals the number of stages in the FIR filter 222 and M equals the number of stages in the decision feedback equalizer 224. The equalizer 120 then passes the equalized data to a trellis decoder 350. An error signal 310 is generated by subtracting the input to the slicer 226 from its output. The error signal 310 is multiplied by a step size 320 before it is used to update the tap coefficients. Typically, the step size 320 is less than one, in order to permit the error signal to iteratively adjust the coefficient taps over multiple cycles, so that variations in channel response and noise are averaged out. Generally, the smaller the step size, the more severe the transient conditions under which the equalizer 120 can converge, though at the cost of slower convergence.

Figure 4:
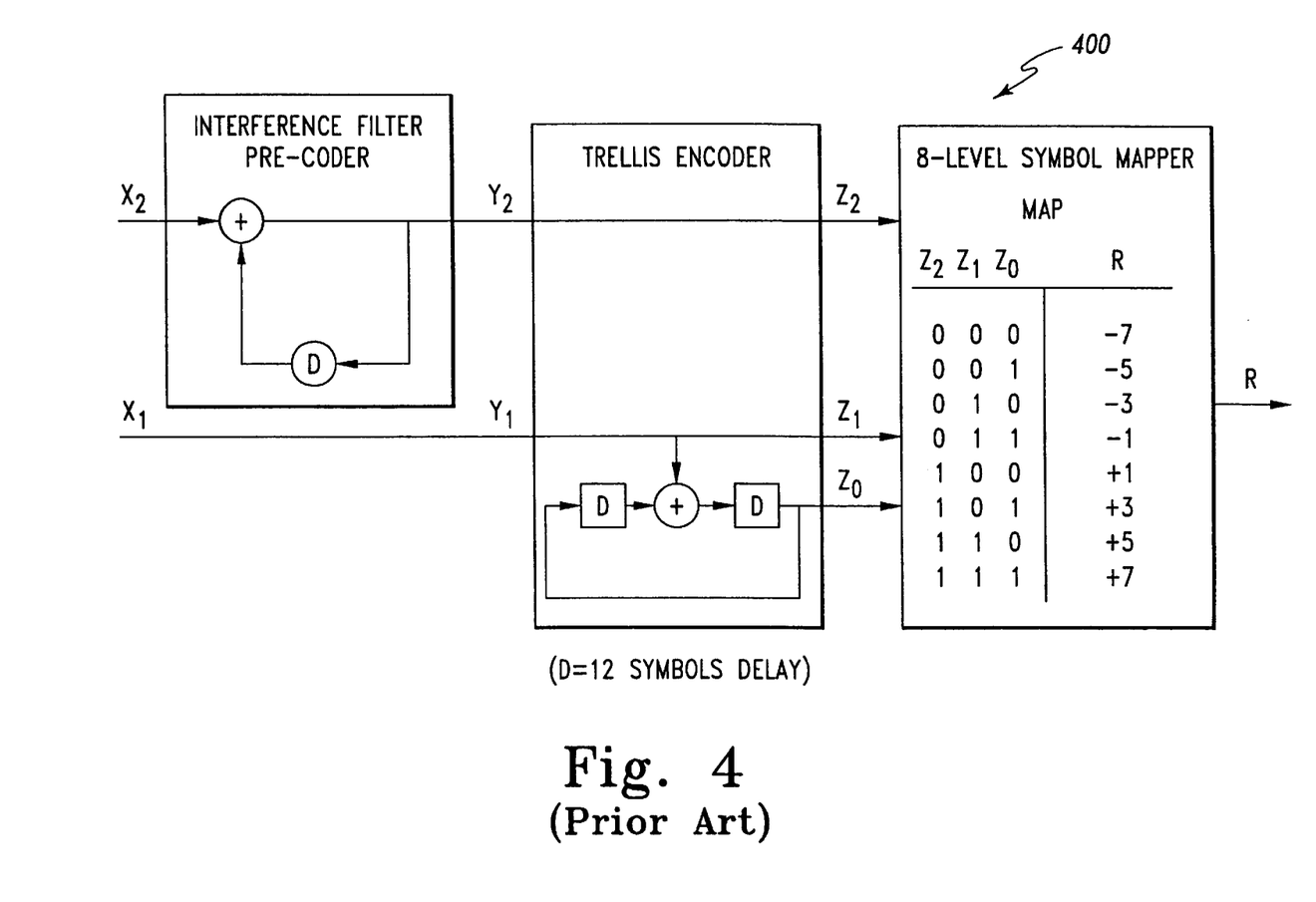
FIG. 4 is a diagram of a prior art 8VSB trellis encoder, precoder, and symbol mapper.

FIG. 4 shows the further details of a trellis encoder, shown generally at 400, suitable for use with the decision feedback equalizer 224 shown in FIG. 3. The trellis encoder 400 is the 8 VSB trellis encoder, precoder, and symbol mapper. As will be known by those skilled in the art, the 8 VSB trellis encoder 400 uses an 8-level, 3-bit, one dimensional constellation. As can be seen from FIG. 4, the 8 VSB trellis encoder 400 uses a $\frac{2}{3}$ rate trellis code.

Typically, the trellis decoder 350 uses a Viterbi algorithm to decode the signal encoded by the 8 VSB trellis encoder 400. Typically, the trellis decoder 350 has a large number of stages—most often 16 or 24. The decoded output 229 is de-interleaved by the de-interleaver 140, and then sent to the outer decoder 150.

Figure 5:
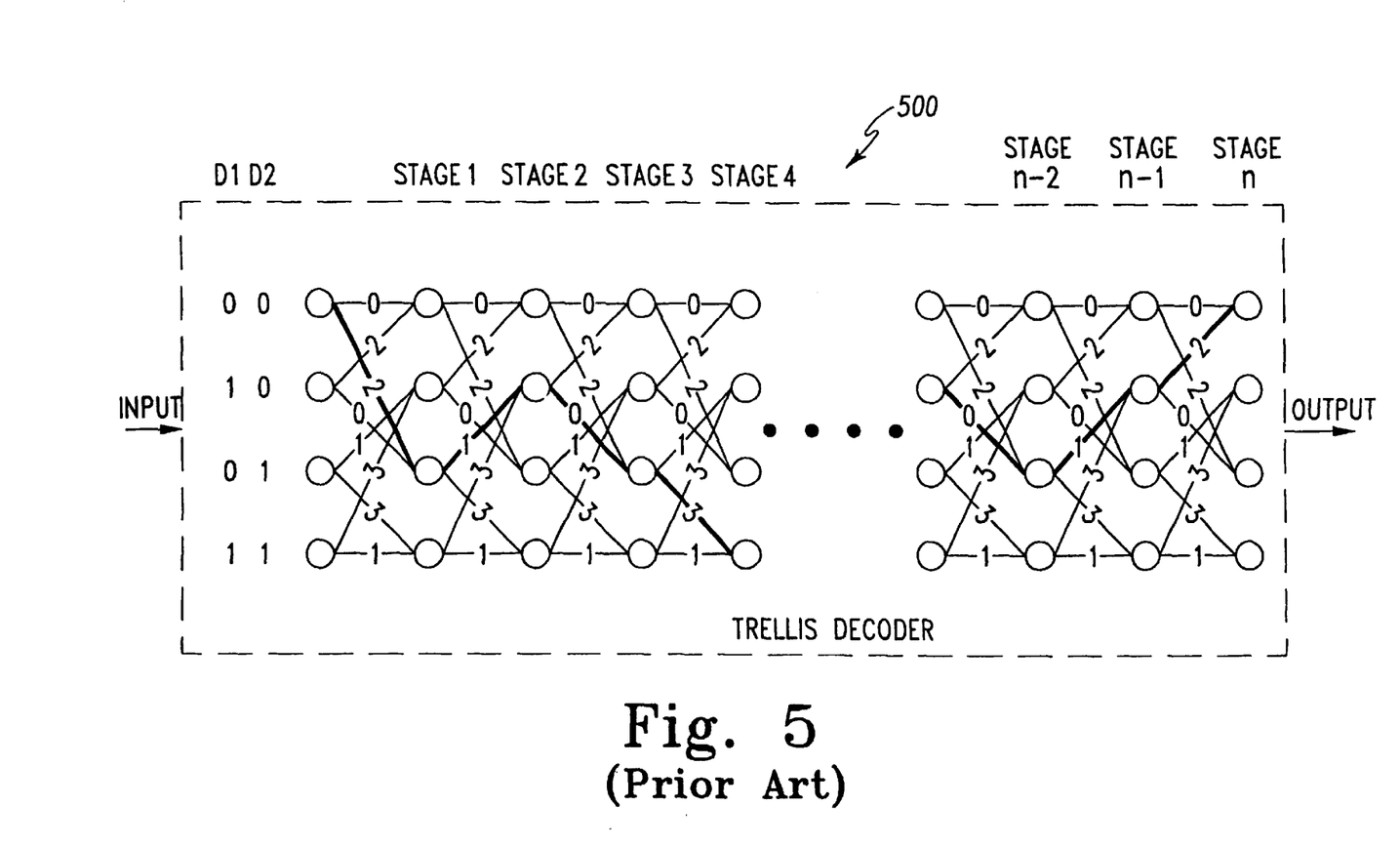
FIG. 5 is a prior art trellis diagram.

FIG. 5 shows a typical trellis diagram for an 8 VSB trellis code with n stages, shown generally at 500. The heavier line illustrates a current survive path. At each decoding clock cycle a new symbol is sent to the trellis decoder and the survive path is renewed. It will be appreciated that in a VSB system each sample contains one symbol, while in QAM or offset-QAM systems, each sample contains two symbols—one in the I channel, the other in the Q channel. However, regardless of the sample size, the coding and decoding is always performed symbol by symbol. At each stage a decision is made about which state is the most likely (i.e., which symbol was most likely transmitted), based on the survive path. For example, stage 1 gives the first estimation to the input, and stage 2 gives the second estimation to the input, etc. It will be appreciated that the survive path may change based on the decoding process as each new input symbol is received, so that the survive path may not be the same (though shifted one symbol) from one input sample time to another.

Figure 6:
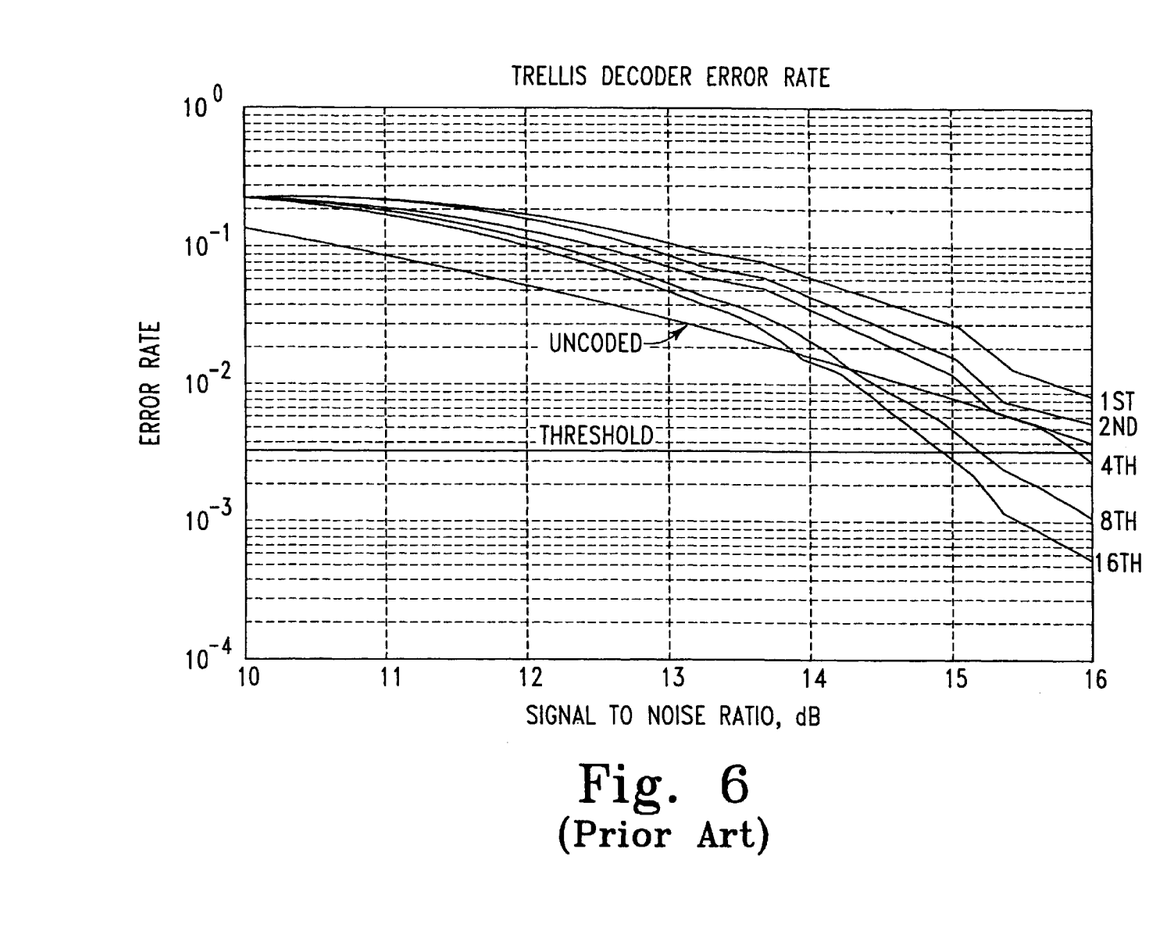
FIG. 6 is a graph showing the relationship between error rate and signal-to-noise ratio.

FIG. 6 shows the decoding error rate using a typical trellis decoder with the Viterbi decoding algorithm. As can be seen from the graph, while the system is running at the threshold, or even slightly below it, the error rate is lower after decoding, and the greater the number of decoding stages, the lower the error rate. It can also be seen that the error rate decreases greatly as the signal-to-noise ratio increases. Note that the threshold shown is the boundary in an 8 VSB system where the bit error rate after Reed-Solomon decoding is one in $10^6$.

It will be appreciated that the equalizer 120 cannot converge if the decision device 226 makes too many errors. For example, it is believed that if a slicer 226 has an error rate greater than about 0.1 the equalizer will not converge. Therefore, at start up, when there are large channel distortions, equalizer 120 cannot start to work. It has to use training signals, if available, to compensate for the channel distortion, or use a different type of algorithm, such as blind equalization, to converge. Using the training signals alone, or in combination with blind equalization may still not be sufficient to converge. Even if they are sufficient, it can be difficult to determine this fact, or at what point the compensation becomes acceptable. Furthermore, in blind equalization methods the feedback portion of the equalizer 120 is not based on decisions from the decision device 226, and therefore a much higher resolution is required. Consequently, hardware that is substantially more complex may be required.

Those skilled in the art will also appreciate that during operation of an equalizer 120 it is desirable to reduce the step size when the signal-to-noise ratio is lower. To achieve that end, a stop-and-go algorithm could be used to stop the DFE 224 when the signal-to-noise ratio falls below some threshold. However, it can be difficult to determine the signal-to-noise ratio from instant to instant during operation. Therefore, most systems employing such an algorithm improve performance only under certain circumstances, and at the cost of poorer performance under other conditions.

What is needed is an equalizer in which the step size is adjusted in relation to the error rate from the decision device. The present invention is directed towards meeting these needs, as well as providing other advantages over prior equalizers.

SUMMARY OF THE INVENTION

A first embodiment adaptive equalizer comprises: a decision device; a decision feedback equalizer coupled to the decision device; an FIR filter coupled to the decision device; and a trellis decoder coupled to the decision device, adapted to provide a reliability output and a decoded output. An error signal is generated by subtracting an output of the decision feedback equalizer from an output of the decision device, the error signal being used to update coefficients of the taps of the FIR filter and the decision feedback equalizer. A magnitude of the change to the coefficients is selected based at least in part the reliability output of the trellis decoder.

A second embodiment adaptive equalizer comprises: a slicer; a decision feedback equalizer coupled to the slicer; an FIR filter coupled to the decision device; and a Viterbi decoder coupled to the decision device, adapted to provide a eliability output and a decoded output. The Viterbi decoder determines the reliability output by generating a soft output from each decoding stage of the Viterbi decoder, each soft output being equal to the difference between an accumulated metric of a survive path and a deleted path for the decoding stage, the soft output of a final decoding stage being used as the reliability output. An error signal is generated by subtracting an output of the equalizer from an output of the decision device, the error signal being used to update coefficients of the taps of the FIR filter and the decision feedback equalizer. A magnitude of the change to the coefficients is selected based at least in part the reliability output of the trellis decoder.

A third embodiment adaptive equalizer comprises: a decision device; an FIR filter coupled to the decision device; a decision feedback equalizer coupled to the decision device; and a trellis decoder coupled to the decision device and adapted to produce a reliability output and a decoded output. The error signal is generated by subtracting a delayed output of the equalizer from an output of the trellis decoder. A magnitude of change in the coefficients is selected based at least in part upon the reliability output.

A fourth embodiment adaptive equalizer comprises: a slicer; an FIR filter coupled to the slicer; a DFE coupled to the slicer; a Viterbi decoder coupled to the decision device and adapted to produce a reliability output and a decoded output; and a mapper coupled to receive the decoded output of the Viterbi decoder and to generate a mapped and scaled output. The error signal is generated by delaying an output of the DFE by a number of cycles equal to a number of cylces the Viterbi decoder uses to generate the reliability output and subtracting the delayed output of the DFE from an output of the Viterbi decoder. A magnitude of change in the coefficients is selected based at least in part upon the reliability output and at least in part upon the error signal.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates. In particular, although the invention is discussed in terms of an 8VSB system, it is contemplated that the invention can be used with other types of modulation coding, including, for example, QAM and offset-QAM.

Figure 7:
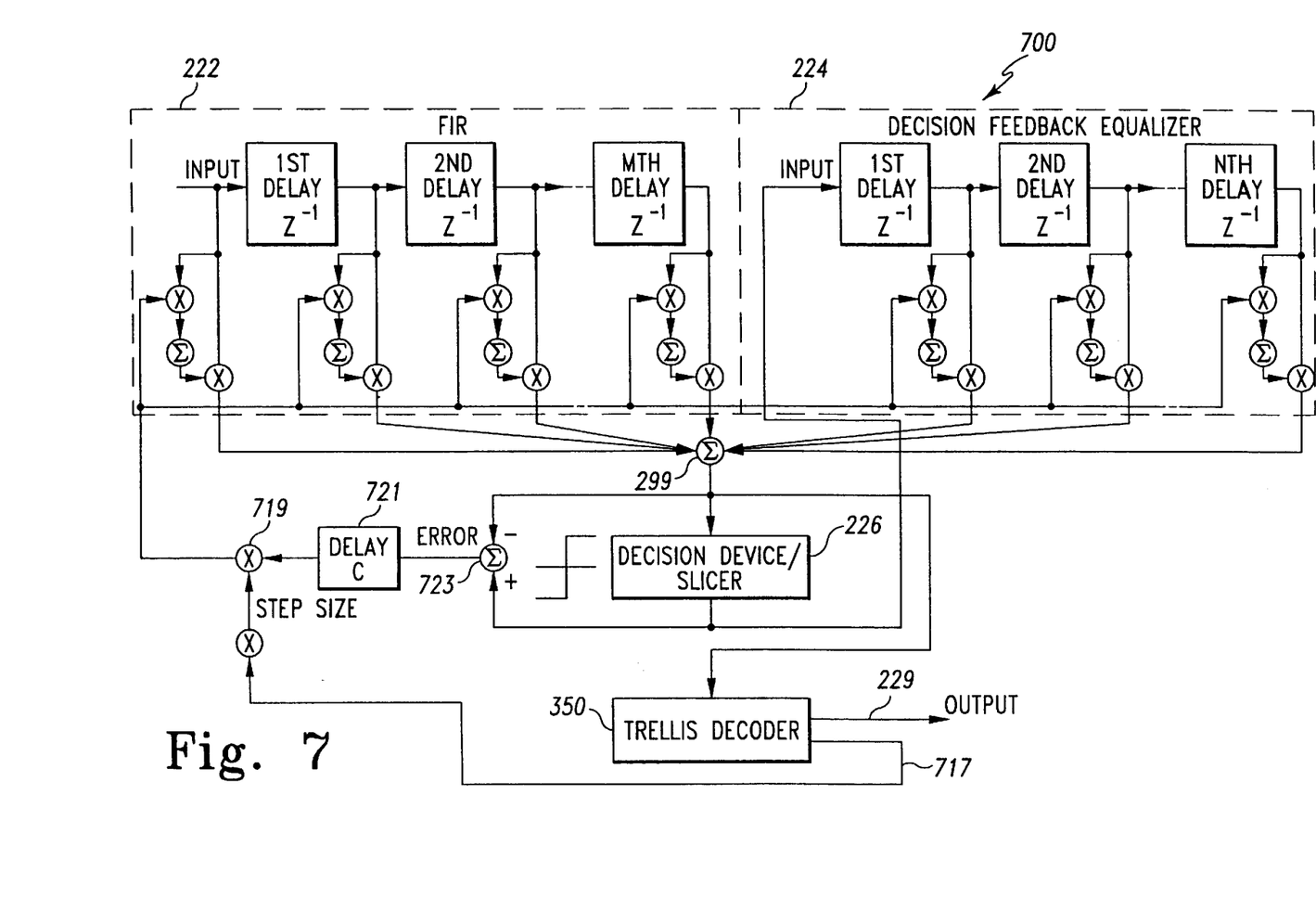
FIG. 7 is a diagram of a first embodiment adaptive equalizer according to the present invention.

FIG. 7 illustrates an equalizer embodying the present invention, indicated generally at 700. In addition to the usual output 229, the trellis decoder 350 outputs a signal 717, related to the reliability of the output signal 229. The reliability signal 717 is used to adjust the step size 719. The delay 721 is necessary to synchronize the output of the error signal 723 with the corresponding values for the reliability signal 717. That is, the length of the delay 721 should match the number of cycles necessary for the trellis decoder 350 to generate the reliability signal 717.

In certain embodiments, the trellis decoder 350 is a Viterbi decoder. As is known in the art, a Viterbi decoder compares two possible state transitions at each bit and determines which is the more likely to correspond to the originally transmitted signal. In the equalizers 700 employing a Viterbi decoder 350, at each decoding stage the decoding output is coupled with a soft output corresponding to the difference between the accumulated metric of the survive path and the deleted path. When the decoder reaches the last decoding stage, the decoded output 229 is determined along with the final soft output, which is used as the reliability signal 717.

It will be appreciated that there are many possible soft decoding algorithms available for decoding a trellis encoded signal, and that any of these soft decoding algorithms can be used to generate a reliability signal 717. It will also be appreciated that the reliability signal can be generated from any stage in the trellis decoder, though, generally, the later the stage used, the fewer decoding errors that will remain, so the more precisely the reliability signal 717 will correspond to the decoding quality.

It will be appreciated that by giving a lower weight to an unreliable error signal 723, such as is experienced at start up, the DFE 224 in the equalizer 700 can converge (albeit more slowly) due to the smaller step size, which permits averaging over a larger number of symbols. Conversely, when the reliability is higher, the error signal will be weighted more heavily, permitting faster convergence.

It will also be appreciated that the benefits of adjusting the step size can permit these improvements without the need to stop the DFE 224 entirely during periods of low reliability. In other words, the variable step size is an alternative to a start-and-stop algorithm in which the DFE 224 need not be hard-switched. Thus, the DFE 224 always works with decisions from the decision device 226. The DFE 224 in the equalizer 700 can therefore use a lower resolution and simpler hardware than would be necessary in an equalizer 120 employing a stop-and-go algorithm.

In certain other embodiments, an equalizer 700 according to the present invention employs a stop-and-go algorithm triggered by the value of the reliability signal 717. In certain of these embodiments, the DFE 224 and FIR filter 222 update their coefficients when the reliability signal 717 corresponds to a value above a pre-selected threshold. Such alternative embodiments are well suited for coping with impulse noise and severe but instantaneous channel distortions, since they can prevent the coefficients from being updated when the decision error rate is high enough to cause divergence, yet require little additional hardware relative to prior adaptive equalizers. Furthermore, even at startup, the equalizer 700 will converge, since the error signal generated from unreliable symbols will be ignored.

Figure 8:
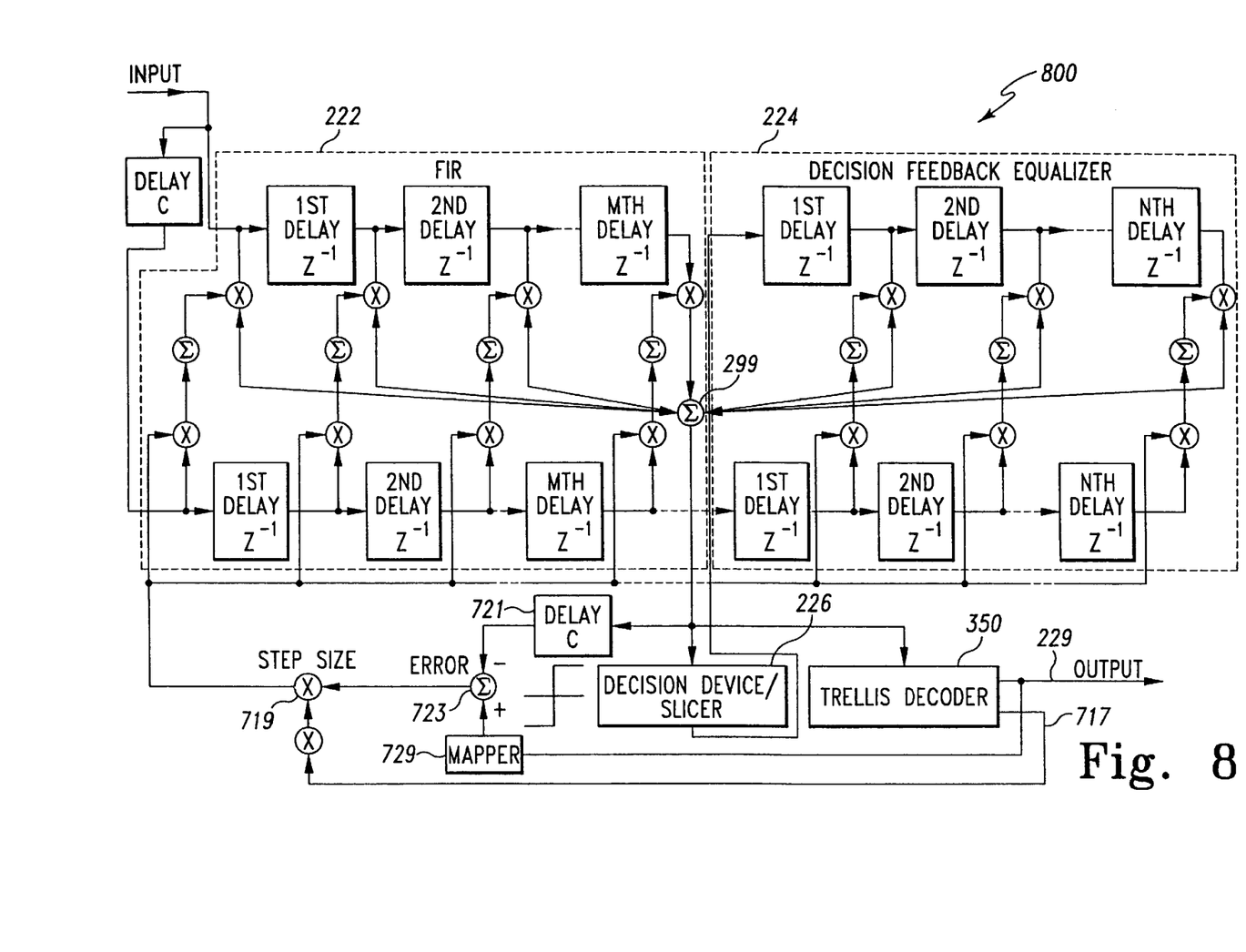
FIG. 8 is a diagram of an adaptive equalizer according to the present invention.

FIG. 8 shows a preferred embodiment equalizer according to the present invention, indicated generally at 800. The error 723 is generated from the difference between the output 299 of the equalizer 800 and the output 229 of the trellis decoder 350. Before the outputs 299 and 229 are used to generate the error signal, the output 229 is mapped and scaled back to data bits (1s and 0s) by a mapper 729, and the output 299 of the equalizer 800 is delayed by a delay 721 in order to synchronize it with the corresponding output of the trellis decoder 350. The reliability signal 717 is then used to set the step size applied to the error signal 723.

It will be appreciated that some encoding schemes have multiple independent encoders running in parallel. For example, in the 8 VSB system, there are typically 12 encoders. Typically, trellis code intrasegment interleaving is used in such systems. This uses a corresponding number of identical trellis encoders and precoders operating on interleaved data symbols. In a system with 12 parallel encoders, for example, the code interleaving is accomplished by encoding the 0th, 12th, 24th . . . symbols as on group, the 1st, 13th, 25th . . . symbols as a second group, the 2nd, 14th, 26th . . . symbols as a third group, and so on for a total of 12 groups.

Figure 9:
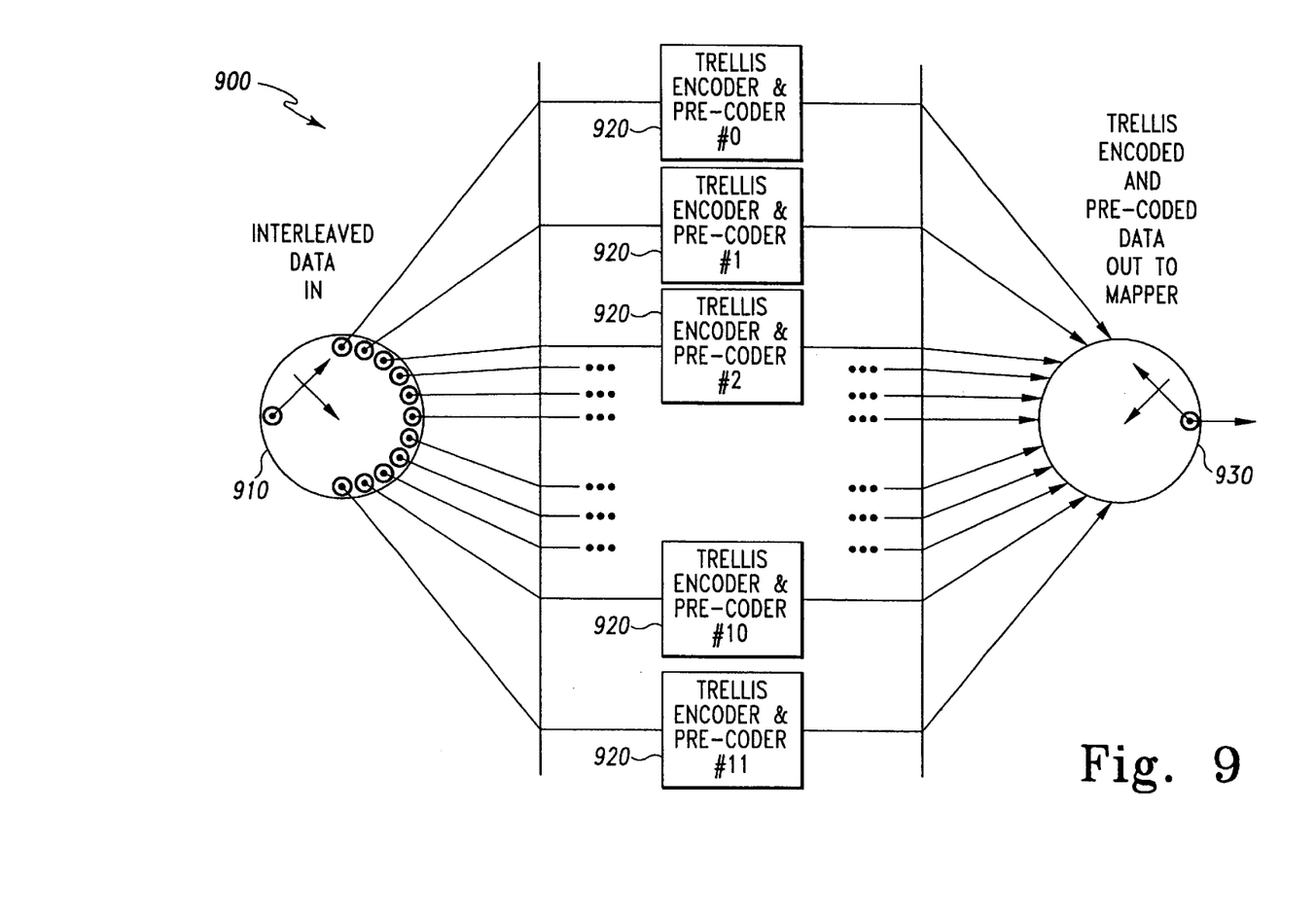
FIG. 9 is a diagram of a preferred embodiment trellis code interleaver according to the present invention.
Figure 10:
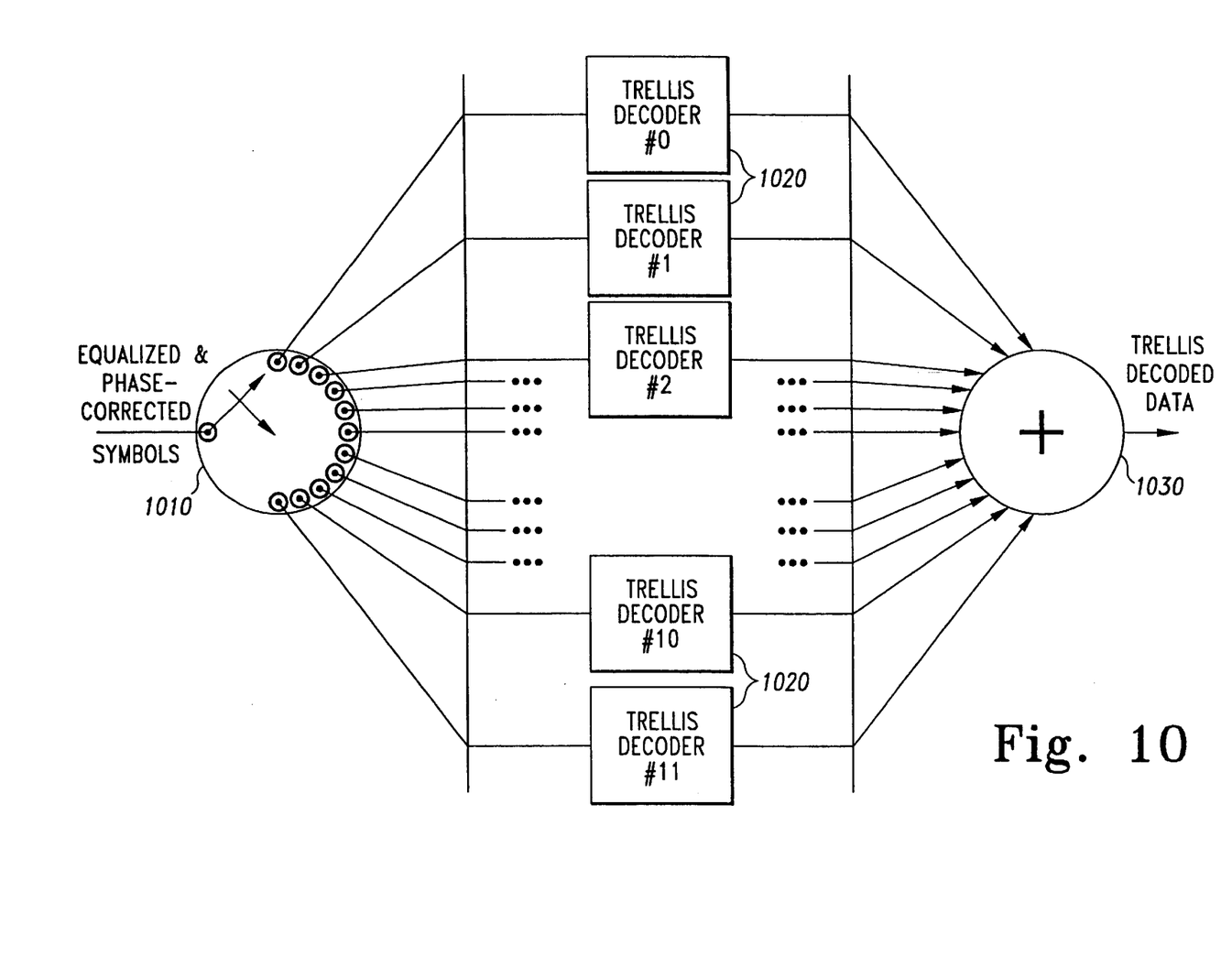
FIG. 10 is a diagram of a preferred embodiment trellis code de-interleaver according to the present invention.

FIG. 9 illustrates a trellis code and precoder intrasegment interleaver, shown generally at 900, that feeds a mapper such as the one shown in FIG. 4. Bytes are fed from the byte interleaver (or multiplexer) 910 to the trellis encoder and precoders 920, and they are processed as whole bytes by each of the twelve encoders 920. Each byte produces four symbols from a single encoder 920. A demultiplexer 930 reassembles these bytes into a single bit stream. The 8 VSB receiver uses 12 trellis decoders in parallel, each receiving every 12th symbol, as shown in FIG. 10. The bit stream is again interleaved by a multiplexer 1010, fed to the parallel decoders 1020, and then reassembled into a single bit stream by a demultiplexer 1030.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An adaptive equalizer comprising:

a decision device;

an FIR filter coupled to the decision device;

a DFE coupled to the decision device, the DFE producing a DFE output;

a Viterbi decoder coupled to the decision device, the Viterbi decoder producing a reliability output and a decoded output;

a mapper coupled to receive the decoded output of the Viterbi decoder and to generate a mapped and scaled output;

wherein the error signal is generated by delaying the DFE output by a number of cycles equal to a number of cycles the Viterbi decoder uses to generate the reliability output and subtracting the delayed decoded output of the DFE from the mapped and sealed output of the mapper;

wherein a magnitude of change in the coefficient of the adaptive equalizer is selected based at least in part upon the reliability output and at least in part upon the error signal.

* * * * *

UNITED STATES PATENT AND TRADEMARK OFFICE
CERTIFICATE OF CORRECTION

PATENT NO. : 6,829,297 B2
DATED : December 7, 2004
INVENTOR(S) : Xia et al.

It is certified that error appears in the above-identified patent and that said Letters Patent is hereby corrected as shown below:

<u>Column 8,</u>
Line 47, delete "sealed" and insert -- scaled --.

Signed and Sealed this

Twenty-fifth Day of April, 2006

JON W. DUDAS
*Director of the United States Patent and Trademark Office*